US010025891B1

(12) United States Patent
Zaki et al.

(10) Patent No.: US 10,025,891 B1
(45) Date of Patent: Jul. 17, 2018

(54) METHOD OF REDUCING RANDOM DRIFT IN THE COMBINED SIGNAL OF AN ARRAY OF INERTIAL SENSORS

(71) Applicants: Ahmed S Zaki, Kingston, RI (US); Richard Vaccaro, Kingston, RI (US)

(72) Inventors: Ahmed S Zaki, Kingston, RI (US); Richard Vaccaro, Kingston, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 276 days.

(21) Appl. No.: 14/870,061

(22) Filed: Sep. 30, 2015

(51) Int. Cl.
| | |
|---|---|
| *G01C 19/00* | (2013.01) |
| *G06F 17/50* | (2006.01) |
| *G01P 21/00* | (2006.01) |
| *G01C 25/00* | (2006.01) |
| *G06F 17/18* | (2006.01) |
| *G06F 17/16* | (2006.01) |

(52) U.S. Cl.
CPC ......... *G06F 17/5009* (2013.01); *G01C 25/00* (2013.01); *G01P 21/00* (2013.01); *G06F 17/16* (2013.01); *G06F 17/18* (2013.01)

(58) Field of Classification Search
CPC ...... G06F 17/5009; G06F 17/16; G06F 17/18; G01C 25/00; G01P 21/00
USPC .......................................................... 702/104
See application file for complete search history.

(56) References Cited

U.S. PATENT DOCUMENTS

| | | | |
|---|---|---|---|
| 2010/0088063 A1* | 4/2010 | Laughlin ................ | G01C 19/38 702/151 |
| 2011/0093250 A1* | 4/2011 | Lin ........................ | G01C 19/38 703/7 |
| 2012/0245839 A1* | 9/2012 | Syed .................... | G01C 21/165 701/408 |
| 2014/0288896 A1* | 9/2014 | Li .......................... | G01C 19/38 703/2 |

OTHER PUBLICATIONS

Vaccaro et al, "Reduced-Drift Virtual Gyro from an Array of Low-Cost Gyros", Feb. 11, 2017, Sensors 2017, 17, 352; doi:10.3390.*
Li et al, "Sliding Average Allan Variance for Inertial Sensor Stochastic Error Analysis", Dec. 2013, IEEE Transactions on Instrumentation and Measurement, vol. 62, No. 12, p. 3291-3300.*
Richard J. Vaccaro, and Ahmed S. Zaki, Statistical Modeling of Rate Gyros, paper, Mar. 2012, pp. 673-684, vol. 61, No. 3, IEEE, USA.

* cited by examiner

*Primary Examiner* — Stephanie Bloss
(74) *Attorney, Agent, or Firm* — James M. Kasischke; Jean-Paul A. Nasser

(57) ABSTRACT

The disclosed invention provides a method that exploits the correlations in the statistical properties of one inertial sensor to another. Among the dominant noise sources, the additive noise terms for different sensors are uncorrelated, however, there may be correlations between the random drift of different sensors. The method of the present invention estimates these correlations from a finite amount of calibration data in order to calculate coefficients for the optimal linear combination of multiple sensor signals. The method is a means of combining the multiple sensor outputs to obtain a virtual sensor signal with reduced drift, and in a far more time efficient and less processor intensive way than the prior art.

14 Claims, 1 Drawing Sheet

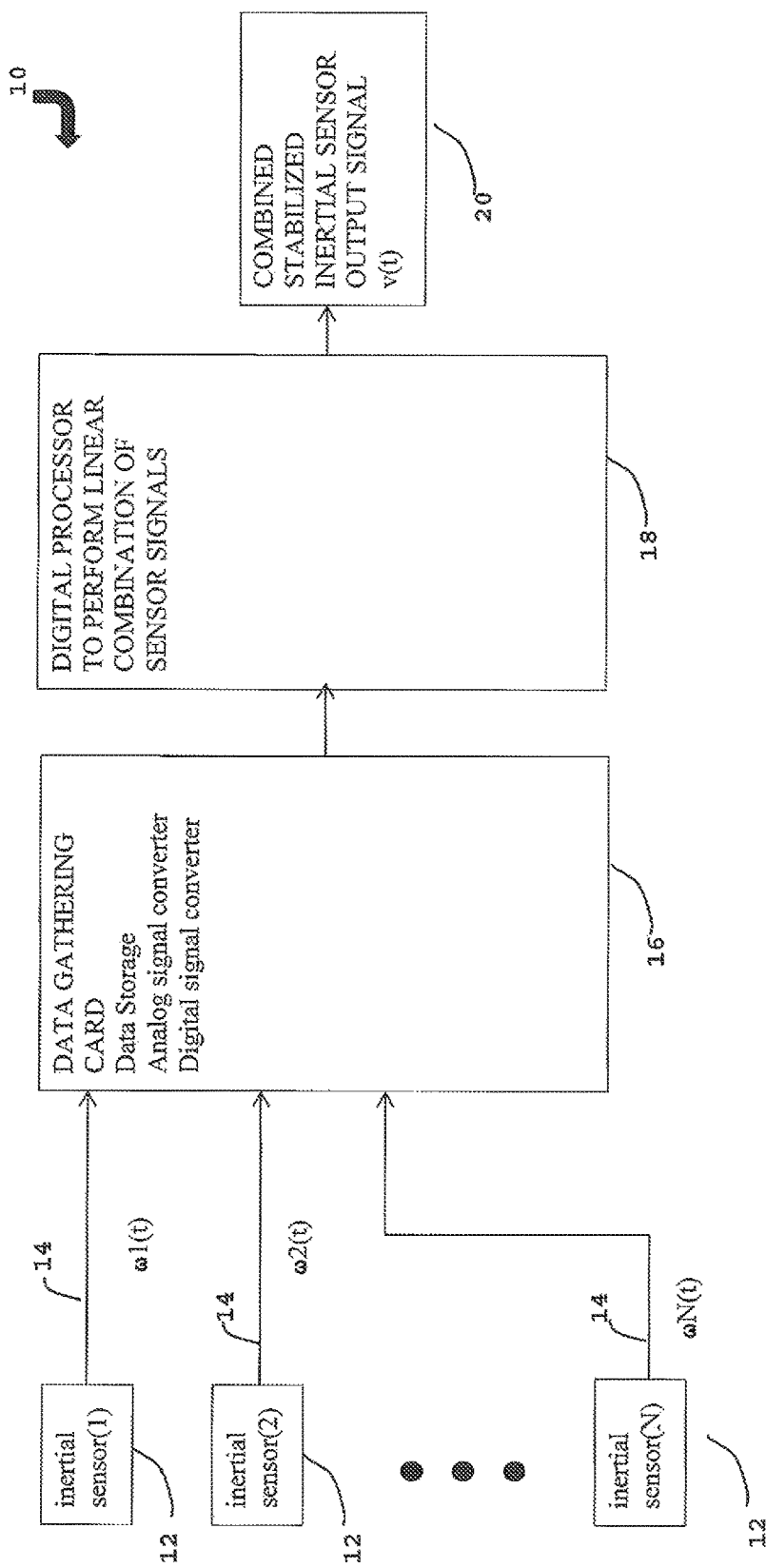

METHOD OF REDUCING RANDOM DRIFT IN THE COMBINED SIGNAL OF AN ARRAY OF INERTIAL SENSORS

STATEMENT OF GOVERNMENT INTEREST

The invention described herein may be manufactured and used by or for the Government of the United States of America for governmental purposes without the payment of any royalties thereon or therefore.

CROSS REFERENCE TO OTHER PATENT APPLICATIONS

None.

BACKGROUND OF THE INVENTION

(1) Field of the Invention

The present invention relates to the components of inertial measurement units, sensors such as gyroscopes and accelerometers. More particularly, the invention relates to a method to calculate optimal weights for use in combining the signals from an array of gyroscopes or accelerometers into a single, low-drift signal to improve the resonant sensor bias stability relative to a single gyroscope or accelerometer.

(2) Description of the Prior Art

Gyroscopes and accelerometers are necessary components of inertial measurement units (IMUs), which are used for the guidance and stabilization of many platforms. The performance of a rate gyroscope or accelerometer is influenced by a number of factors including scale-factor errors, quantization effects, temperature effects, random drift, and additive noise. A comprehensive account of all of these influencing factors for gyroscopes has been established in a standard published by the Institute for Electrical and Electronics Engineers (IEEE). Among the many possible noise sources identified in the IEEE standard, the additive noise and random drift are often the dominant sources. This is true of tactical-grade microelectromechanical systems (MEMS) sensors, which are of interest for use in tactical IMUs.

In an array of multiple inertial sensors, such as an array of MEMS gyroscopes, the goal is to combine the multiple sensor outputs without a loss of accuracy associated with the in-run bias stability of the sensors. There exist prior art methods of combining the outputs of the array of sensors to improve the bias stability of the collective output, Bayard et al, U.S. Pat. No. 6,882,964. The prior art methods rely upon the use of Kalman filtering and averaging. These prior art methods tend to be time consuming and processor intensive.

The approach of the present invention is to exploit the correlations in the statistical properties of one sensor to another. Among the dominant noise sources, the additive noise terms for different sensors are uncorrelated, however, there may be correlations between the random drift of different sensors. The method of the present invention is to estimate these correlations from a finite amount of calibration data in order to calculate coefficients for the optimal linear combination of multiple sensor signals. The method of the present invention relies on a prior art method developed by the present inventors described in an article published in *IEEE Transactions on Instrumentation and Measurement*, Volume 61, Issue 3, Pages 673-684, 6 Feb. 2012, entitled: "*Statistical Modeling of Rate Gyros*". The method of the present invention is a means of combining multiple sensor outputs to obtain a virtual sensor signal with reduced drift, and in a far more computationally efficient and less processor intensive way than the prior art.

SUMMARY OF THE INVENTION

Accordingly, it is an object of the present invention to provide a method to estimate the correlations between drift components of different sensors from a finite amount of calibration data.

Another object of the present invention is to derive an optimal coefficient vector to weight the output signal vector of an array of inertial sensors such as gyroscopes to create an optimal linear combination of signals.

In accordance with the method of the present invention, an array of multiple gyroscopes is modeled mathematically. The output signal vector of the array is represented as the weighted sum of the vector of true rate signals, the vector of the gyroscope biases (random drift) and an observation noise vector. The gyroscope biases and noise vectors are modeled using spectral density matrices Q and R. The spectral densities are estimated using statistical estimation theory and Allan covariance statistics. Specifically, the off-diagonal terms of the spectral density matrix Q for the random drift component of the array of gyroscopes are estimated. This estimate is then used to derive an optimal coefficient vector to weight the output signal vector of the array of gyroscopes to create an optimal linear combination of signals into a single virtual signal.

BRIEF DESCRIPTION OF THE DRAWINGS

Other objects, features and advantages of the present invention will become apparent upon reference to the following description of the preferred embodiments and to the drawings, wherein corresponding reference characters and elements indicate corresponding parts throughout the several views of the drawings and wherein:

FIG. 1 is a block diagram of an inertial measurement unit that implements the method of the present invention by combining an array of multiple inertial sensors in a manner that reduces the random drift in the combined signals of the array.

DETAILED DESCRIPTION OF THE INVENTION

The present invention is a method of combining multiple sensor outputs from an array of inertial sensors. Referring to FIG. 1 there is illustrated an inertial measurement unit 10 that consists of the following components: an array of N inertial sensors 12, an electronic data gathering card 16 joined to the array of N inertial sensors 12, and an electronic digital processor 18 joined to the data gathering card 16. In a preferred embodiment the inertial sensors 12 are tactical-grade microelectromechanical systems (MEMS) 3 axes orthogonal accelerometers or 3 axes orthogonal gyroscopes. Each inertial sensor 12 in the array generates a signal 14 that is received by the data gathering card 16. In a preferred embodiment, the data gathering card 16 will have data storage capability and be capable of performing analog to digital conversion or digital to analog conversion depending upon the type of inertial sensor 12 used. The digital processor 18 can be a microcontroller and will be programmed to receive data from the data gathering card 16 and implement the linear combination of sensor signals 14 through the method of the present invention.

The first step in the method is to mathematically model the array of inertial sensors 12. For purposes of illustration the sensors will be referred to as gyroscopes in the following description of the method. In order to model an array of gyroscopes 12 it suffices to jointly model two gyroscopes by estimating the correlation properties between the two gyroscopes as well as their individual statistical properties. This can then be done for an array of any number of gyroscopes by modeling all pairwise combinations of gyroscopes. The output signal vector, y(t), of a two gyroscope array is described by the following equation:

$$y(t)=\omega(t)+b(t)+n(t) \quad (1)$$

where $\omega(t)$ is a vector of true rate signals 14, (wherein $\omega1(t)$ is the signal 14 from inertial sensor(1) and $\omega2(t)$ is the signal 14 from inertial sensor(2) and $\omega(t)=[\omega(t) \: \omega2(t)]^T$, b(t) is a vector of gyroscope biases, and n(t) is an observation noise vector. In the absence of motion, the true rate is zero and the gyroscope output signal consists of bias plus noise. The bias term b(t) is a vector of rate random walks or RRW, and the additive noise term n(t) is a vector of angle random walks or ARW.

The next step is to model the statistical properties of the bias vector and noise vector with spectral density matrices. The elements of the noise vector n(t) are modeled as statistically independent bandlimited white noise processes with spectral densities $R_1$ and $R_2$, respectively, and common bandwidth B Hz. The spectral density matrix of n(t), R, is expressed as follows:

$$R = \begin{bmatrix} R_1 & 0 \\ 0 & R_2 \end{bmatrix} \quad (2)$$

The spectral density matrix of b(t) is a random walk arising from w(t), a vector white-noise process with a spectral density matrix Q expressed as follows:

$$E[w(t_1)w(t_2)] = Q\delta(t_1 - t_2), \: Q = \begin{bmatrix} Q_{11} & Q_{12} \\ Q_{12} & Q_{22} \end{bmatrix} \quad (3)$$

The next step is to estimate the nonzero elements of R and Q of the additive noise and random drift components of the gyroscope signals. The matrix R is a diagonal matrix consisting of the spectral densities of the additive noise components of the individual gyroscopes. These and the diagonal elements of Q can be obtained by modeling each gyroscope individually. The modeling of an individual gyroscope is as follows:

$$\begin{bmatrix} \hat{Q} \\ \hat{R} \end{bmatrix} = (H^T C^{-1} H)^{-1} H^T C^{-1} a[m] \quad (4)$$

where H is a known N×p matrix, a[m] is a vector of Allan variance statistics corresponding to a set of points m, C is the sum of the covariance matrices of a[m] for the ARW and RRW terms expressed as $$C=C_R(m,\hat{R}_0)+C_Q(m,\hat{Q}_0) \quad (5)$$

and where $$H = \begin{bmatrix} \frac{(2T)}{3} & \frac{1}{(2T)} \\ \vdots & \vdots \\ \frac{(2^{J-2}T)}{3} & \cdots & \frac{1}{(2^{J-2}T)} \end{bmatrix} \quad (6)$$

The matrix Q is not diagonal. Estimates of $Q_{11}$ and $Q_{22}$ are obtained jointly with $R_1$ and $R_2$ when modeling, individual gyroscopes. The off-diagonal elements, however, are computed by jointly modeling a pair of gyroscopes. The steps for estimating the off-diagonal elements of the Q matrix ($Q_{12}$) are as follows. Define the Allan covariance (a technique to estimate the rate random walk of two sensors $Q_{12}$) matrix for a smoothing interval of m samples to be A[m] for all m∈m where m=[2, 4, . . . $2^n$] expressed as follows:

$$A[m] = \frac{1}{2(M-1)} \sum_{k=1}^{M-1} (z_{k+1} - z_k)(z_{k+1} - z_k)^T \quad (7)$$

Where $z_k$ are averages of length m segments of non-overlapping gyroscope output data 14.

For an array of g gyroscopes, the Allan covariance matrix A[m] is a g×g symmetric matrix. The off-diagonal terms, $A_{ij}[m]$ i≠j are the Allan covariances between gyroscope i and gyroscope j. Estimate the individual gyroscope statistics $R_k$ and $Q_{kk}$, k=1, . . . , g. Let a be the vector whose elements are $A_{ij}[m]$ for all m∈m. Let H=(T/3)m. Calculate the covariance matrix $$C=C_R(m,\hat{R}_i,\hat{R}_j)+C_Q(m,\hat{Q}_i,\hat{Q}_j,0) \quad (8)$$

Estimate the off diagonal terms $Q_{11}$ of the spectral density matrix Q as follows:

$$\hat{Q}_{ij}=(H^T C^{-1} H)^{-1} H^T C^{-1} a \quad (9)$$

Once the spectral density matrix Q is determined, the next step is to generate a combined stabilized inertial sensor output signal in the form of a single scalar virtual gyroscope signal 20, v(t), whose RRW spectral density is $Q_v^*$ by taking a fixed linear combination of the gyroscope signals 14 collected in vector y(t) with the use of a coefficient vector c, which gives the optimal linear combination of gyroscope outputs. The virtual gyroscope signal 20, v(t), is expressed as:

$$v(t)=c^T y(t)=c^T(\omega(t)+b(t)+n(t)) \quad \text{Eq. (10)}$$

where the coefficient vector $c=[c_1 \ldots c_g]^T$ satisfies $$o^T c=1, \text{ with } o=[1 \ldots 1]^T \quad (11)$$

Each gyroscope is measuring the same velocity signal $\omega(t)$. The constraint implies that the weighted signal components in each of the gyroscope signals 14 will add up to $\omega(t)$.

The virtual gyroscope signal 20, v(t), is modeled as the output of a single gyroscope employing the RRW spectral density matrix $Q_v$:

$$Q_v=c^T Q c \quad (12)$$

When the coefficient vector is optimal $$c^* = \frac{Q^{-1} o}{o^T Q^{-1} o} \quad (13)$$

the model becomes:

$$Q_v^* = \frac{1}{o^T Q^{-1} o} \quad (14)$$

wherein no other fixed linear combination of gyroscope signals 14 can have an RRW spectral density lower than $Q_v^*$. The virtual signal 20 is intended for use as control data in the guidance system of a vehicle, for navigation or for the stabilization of a platform.

It will be understood that many additional changes in the details, materials, steps and arrangement of parts, which have been herein described and illustrated in order to explain the nature of the invention, may be made by those skilled in the art within the principle and scope of the expressed in the appended claims.

What is claimed is:

1. A method, to be implemented on a programmable digital processor, for combining a plurality of inertial sensor output signals to give a combined stabilized inertial sensor output signal with a minimal sensor bias comprising the steps of:
    receiving a plurality of inertial sensor output signals from an array of a plurality of inertial sensors electrically joined to said digital processor;
    representing the received plurality of inertial sensor output signals as an output signal vector that is a sum of a vector of a plurality of true rate signals of the plurality of inertial sensors, a vector of a plurality of sensor biases of the plurality of inertial sensors, and a vector of a plurality of observation noise;
    modeling statistical properties of the vector of a plurality of observation noise with a spectral density matrix R, wherein the spectral density matrix R is a diagonal matrix consisting of a plurality of spectral densities of additive noise components of the individual inertial sensors;
    modeling statistical properties of the vector of a plurality of sensor biases with a spectral density matrix Q, wherein the spectral density matrix Q is not a diagonal matrix and consists of a plurality of spectral densities of sensor bias components of the individual inertial sensors and a plurality of cross-spectral densities between a pair of inertial sensors;
    estimating a plurality of nonzero elements of the observation noise spectral density matrix R and a plurality of diagonal elements of the sensor bias spectral density matrix Q;
    estimating a plurality of off-diagonal elements of the sensor bias spectral density matrix Q; and
    generating a combined stabilized inertial sensor output signal v(t) based on the sensor bias spectral density matrix Q by taking a fixed linear combination of the plurality of inertial sensor signals with the use of a coefficient vector c;
    navigating and stabilizing a vehicle using the combined stabilized inertial sensor output signal as control data in a guidance system of said vehicle.

2. The method according to claim 1, wherein the step of representing the received plurality of inertial sensor output signals as an output signal vector that is a sum of a vector of a plurality of true rate signals of the plurality of inertial sensors, a vector of a plurality of sensor biases of the plurality of inertial sensors, and a vector of a plurality of observation noise is expressed as $$y(t) = \omega(t) + b(t) + n(t)$$

where $\omega(t)$ is a vector of true rate signals, b(t) is a vector of inertial sensor biases, and n(t) is a vector of observation noise.

3. The method according to claim 1, wherein the step of modeling statistical properties of the vector of a plurality of observation noise with a spectral density matrix R, wherein the spectral density matrix R is a diagonal matrix consisting of a plurality of spectral densities of additive noise components of the individual inertial sensors is represented as $$R = \begin{bmatrix} R_1 & 0 \\ 0 & R_2 \end{bmatrix}.$$

4. The method according to claim 1, wherein the step of modeling the statistical properties of the vector of a plurality of sensor biases with a spectral density matrix Q, wherein the spectral density matrix Q is not a diagonal matrix and consists of a plurality of spectral densities of sensor bias components of the individual inertial sensors and a plurality of cross-spectral densities between a pair of inertial sensors is represented, for two inertial sensors, as $$Q = \begin{bmatrix} Q_{11} & Q_{12} \\ Q_{12} & Q_{22} \end{bmatrix}.$$

5. The method according to claim 1, wherein the step of estimating a plurality of nonzero elements of the observation noise spectral density matrix R and a plurality of diagonal elements of the sensor bias spectral density matrix Q further comprises the step of:
    modeling an individual inertial sensor as $$\begin{bmatrix} \hat{Q} \\ \hat{R} \end{bmatrix} = (H^T C^{-1} H)^{-1} H^T C^{-1} a[m]$$

where H is a known N×p matrix, T is a sampling interval, C is a sum of covariance matrices, and where $$H = \begin{bmatrix} \frac{(2T)}{3} & \frac{1}{(2T)} \\ \vdots & \vdots \\ \frac{(2^{J-2}T)}{3} & \cdots & \frac{1}{(2^{J-2}T)} \end{bmatrix}.$$

6. The method according to claim 1, wherein the step of estimating a plurality of off-diagonal elements of the sensor bias spectral density matrix Q further comprises the steps of:
    defining an Allan covariance matrix for a smoothing interval of m samples to be A[m] for all m∈m where m=[2, 4, . . . $2^n$] expressed as $$A[m] = \frac{1}{2(M-1)} \sum_{k=1}^{M-1} (z_{k+1} - z_k)(z_{k+1} - z_k)^T$$

defining the Allan covariance matrix A[m] for an array of g inertial sensors as a g×g symmetric matrix, wherein the off-diagonal terms, $A_{ij}[m]$ i≠j are the Allan covariances between inertial sensor i and inertial sensor j;

estimating individual inertial sensor statistics $R_k$ and $Q_{kk}$, k=1, . . . , g;

defining a as the vector whose elements are $A_{ij}[m]$ for all m∈m;

defining H=(T/3)m, where T is a sampling interval;

calculating a covariance matrix $C=C_R(m,\hat{R}_i,\hat{R}_j)+C_Q(m,\hat{Q}_i,\hat{Q}_j,0)$, where C is a sum of covariance matrices; and estimating off diagonal terms $Q_{rp}$ of the spectral density matrix Q according to $\hat{Q}_{ij}=(H^T C^{-1} H)^{-1} H^T C^{-1} a$.

7. The method according to claim 1, wherein the step of generating a combined stabilized inertial sensor output signal v(t) based on the sensor bias spectral density matrix Q by taking a fixed linear combination of the plurality of inertial sensor signals with the use of a coefficient vector c, further comprising the steps of:

expressing the virtual inertial sensor signal v(t) as $v(t)=c^T y(t)=c^T (\omega(t)+b(t)+n(t))$, where the coefficient vector $c=[c_1 \ldots c_g]^T$ satisfies $o^T c=1$, with $o=[1 \ldots 1]^T$, wherein each inertial sensor is measuring the same velocity signal ω(t) and a plurality of weighted signal components in each of the plurality of inertial sensor signals will add up to ω(t); and modeling the signal v(t) as the output of a single inertial sensor by employing an RRW spectral density matrix $Q_v$ expressed as $Q_v=c^T Q c$, such that when the coefficient vector is optimal, $$c^* = \frac{Q^{-1} o}{o^T Q^{-1} o},$$

the model becomes $$Q_v^* = \frac{1}{o^T Q^{-1} o},$$

wherein no other fixed linear combination of inertial sensor signals can have an RRW spectral density lower than $Q_v^*$.

8. A method, to be implemented on a programmable digital processor, for combining a plurality of inertial sensor output signals to give a combined stabilized inertial sensor output signal comprising the steps of:

receiving a plurality of inertial sensor output signals from an array of a plurality of inertial sensors into a data gathering card to convert the plurality of inertial sensor output signals into a digital format and transferring the digital plurality of inertial sensor output signals to a digital processor wherein the subsequent steps are implemented;

representing the received plurality of inertial sensor outputs as an output signal vector that is a sum of a vector of a plurality of true rate signals of the plurality of inertial sensors, a vector of a plurality of sensor biases of the plurality of inertial sensors, and a vector of a plurality of observation noise;

modeling statistical properties of the vector of a plurality of observation noise with a spectral density matrix R, wherein the spectral density matrix R is a diagonal matrix consisting of a plurality of spectral densities of additive noise components of the individual inertial sensors;

modeling statistical properties of the vector of a plurality of sensor biases with a spectral density matrix Q, wherein the spectral density matrix Q is not a diagonal matrix and consists of a plurality of spectral densities of sensor bias components of the individual inertial sensors and a plurality of cross-spectral densities between a pair of inertial sensor;

estimating a plurality of nonzero elements of the observation noise spectral density matrix R and a plurality of diagonal elements of the sensor bias spectral density matrix Q;

estimating a plurality of off-diagonal elements of the sensor bias spectral density matrix Q; and generating a combined stabilized inertial sensor output signal v(t) based on the sensor bias spectral density matrix Q by taking a fixed linear combination of the plurality of inertial sensor signals with the use of a coefficient vector c;

navigating and stabilizing a vehicle using the combined stabilized inertial sensor output signal as control data in a guidance system of said vehicle.

9. The method according to claim 8, wherein the inertial sensors are three (3) axes orthogonal gyroscopes and wherein the step of representing the received plurality of inertial sensor output signals as an output signal vector that is a sum of a vector of a plurality of true rate signals of the plurality of inertial sensors, a vector of a plurality of sensor biases of the plurality of inertial sensors, and a vector of a plurality observation of noise is expressed as $$y(t)=\omega(t)+b(t)+n(t)$$

where ω(t) is a vector of true rate signals, b(t) is a vector of inertial sensor biases, and n(t) is a vector of observation noise.

10. The method according to claim 8, wherein the step of modeling statistical properties of the vector of a plurality of observation noise with a spectral density matrix R, wherein the spectral density matrix R is a diagonal matrix consisting of a plurality of spectral densities of additive noise components of the individual inertial sensors is represented as $$R = \begin{bmatrix} R_1 & 0 \\ 0 & R_2 \end{bmatrix}.$$

11. The method according to claim 8, wherein the step of modeling the statistical properties of the vector of a plurality of sensor biases with a spectral density matrix Q, wherein the spectral density matrix Q is not a diagonal matrix and consists of a plurality of spectral densities of sensor bias components of the individual inertial sensors and a plurality of cross-spectral densities between every pair of inertial sensors is represented, for two inertial sensors, as $$Q = \begin{bmatrix} Q_{11} & Q_{12} \\ Q_{12} & Q_{22} \end{bmatrix}.$$

12. The method according to claim 8, wherein the step of estimating a plurality of nonzero elements of the observation noise spectral density matrix R and a plurality of diagonal elements of the sensor bias spectral density matrix Q further comprises the step of:

modeling an individual inertial sensor as $$\begin{bmatrix} \hat{Q} \\ \hat{R} \end{bmatrix} = (H^T C^{-1} H)^{-1} H^T C^{-1} a[m]$$

where H is a known N×p matrix, T is a sampling interval, C is a sum of covariance matrices, and where $$H = \begin{bmatrix} \frac{(2T)}{3} & \frac{1}{(2T)} \\ \vdots & \vdots \\ \frac{(2^{J-2}T)}{3} & \cdots & \frac{1}{(2^{J-2}T)} \end{bmatrix}.$$

13. The method according to claim 8, wherein the step of estimating a plurality of off-diagonal elements of the sensor bias spectral density matrix Q further comprises the steps of:
defining an Allan covariance matrix for a smoothing interval of m samples to be A[m] for all m∈m where m=[2, 4, . . . $2^n$] expressed as $$A[m] = \frac{1}{2(M-1)} \sum_{k=1}^{M-1} (z_{k+1} - z_k)(z_{k+1} - z_k)^T$$

defining the Allan covariance matrix A[m] for an array of g inertial sensors as a g×g symmetric matrix, wherein the off-diagonal terms, $A_{ij}[m]$ i≠j are the Allan covariances between inertial sensor i and inertial sensor j;
estimating individual inertial sensor statistics $R_k$ and $Q_{kk}$, k=1, . . . , g;
defining a as the vector whose elements are $A_{ij}[m]$ for all m∈m;

defining H=(T/3)m where T is a sampling interval;
calculating a covariance matrix $C=C_R(m,\hat{R}_i,\hat{R}_j)+C_Q(m,\hat{Q}_i,\hat{Q}_j,0)$ where C is a sum of covariance matrices; and
estimating off diagonal terms $Q_{ij}$ of the spectral density matrix Q according to $\hat{Q}_{ij}=(H^T C^{-1} H)^{-1} H^T C^{-1} a$.

14. The method according to claim 8, wherein the step of generating a combined stabilized inertial sensor output signal based on the sensor bias spectral density matrix Q by taking a fixed linear combination of the plurality of inertial sensor signals with the use of a coefficient vector c, further comprising the steps of:
expressing the virtual inertial sensor signal v(t) as $v(t)=c^T y(t)=c^T(\omega(t)+b(t)+n(t))$, where the coefficient vector $c=[c_1 \ldots c_g]^T$ satisfies $o^T c=1$, with $o=[1 \ldots 1]^T$, wherein each inertial sensor is measuring the same velocity signal ω(t) and a plurality of weighted signal components in each of the plurality of inertial sensor signals will add up to ω(t); and
modeling the signal v(t) as the output of a single inertial sensor by employing an RRW spectral density matrix $Q_v$ expressed as $Q_v=c^T Q c$, such that when the coefficient vector is optimal, $$c^* = \frac{Q^{-1} o}{o^T Q^{-1} o},$$

the model becomes $$Q_v^* = \frac{1}{o^T Q^{-1} o},$$

wherein no other fixed linear combination of inertial sensor signals can have an RRW spectral density lower than $Q_v^*$.

* * * * *